Feb. 16, 1937.   J. F. LINCOLN ET AL   2,070,949
WELDING CURRENT GENERATION
Filed Jan. 30, 1935   3 Sheets-Sheet 1

INVENTORS
James F. Lincoln
BY George G. Landis.
Fay, Oberlin & Fay
ATTORNEYS

Feb. 16, 1937.  J. F. LINCOLN ET AL  2,070,949
WELDING CURRENT GENERATION
Filed Jan. 30, 1935    3 Sheets-Sheet 2

INVENTORS
James F. Lincoln and
BY George G. Landis.
Fay, Oberlin & Fay
ATTORNEYS.

INVENTORS
James F. Lincoln and
George G. Landis
BY Fay, Oberlin & Fay ATTORNEYS

Patented Feb. 16, 1937

2,070,949

UNITED STATES PATENT OFFICE 2,070,949

WELDING CURRENT GENERATION

James F. Lincoln, Shaker Heights, and George G. Landis, University Heights, Ohio, assignors to The Lincoln Electric Company, Cleveland, Ohio, a corporation of Ohio Application January 30, 1935, Serial No. 4,048

8 Claims. (Cl. 171—223)

This invention relates as indicated to welding current generation and more particularly to apparatus for generating the welding current used in the electric welding arc, characterized by improved regulation of the apparatus, thus making possible the carrying on of the electric arc welding operation in a more efficient manner.

As is well known to those familiar with the art, it has been common practice in the construction of electric arc welding current generators to provide in a machine an exciting winding and a bucking winding connected in series with the arc. The regulation of machines of this character has heretofore been inferior in many respects due principally to the transformer action which occurs between the series and exciter windings in the generator due principally to the rapid changes in the amount of welding current flow.

It is a principal object of this invention to provide the apparatus for generating electric arc welding current in which the above enumerated disadvantages of the prior art have been overcome.

Other objects of our invention will appear as the description proceeds.

To the accomplishment of the foregoing and related ends, said invention, then consists of the means hereinafter fully described and particularly pointed out in the claims; the annexed drawings, and the following description setting forth in detail certain means and one mode of carrying out the invention, such disclosed means and mode illustrating, however, but one of various ways in which the principle of the invention may be used.

In said annexed drawings:—

Figure 2:
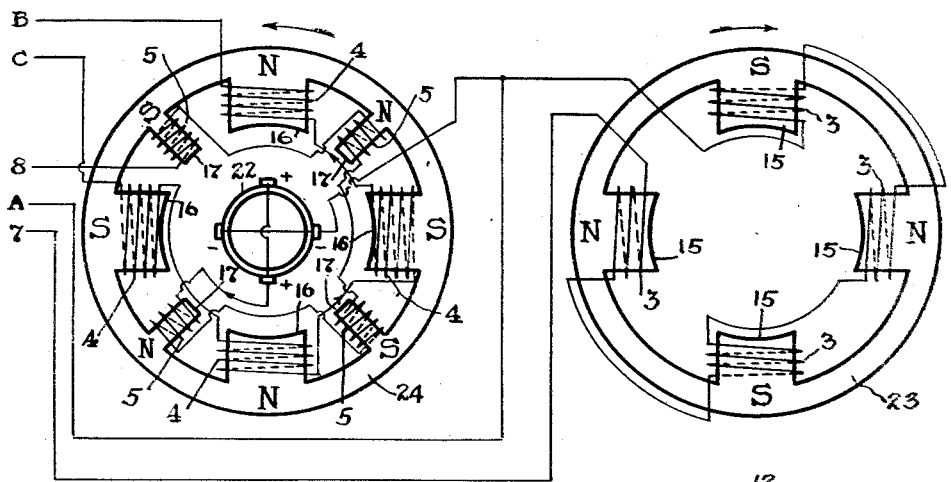
Figure 3:
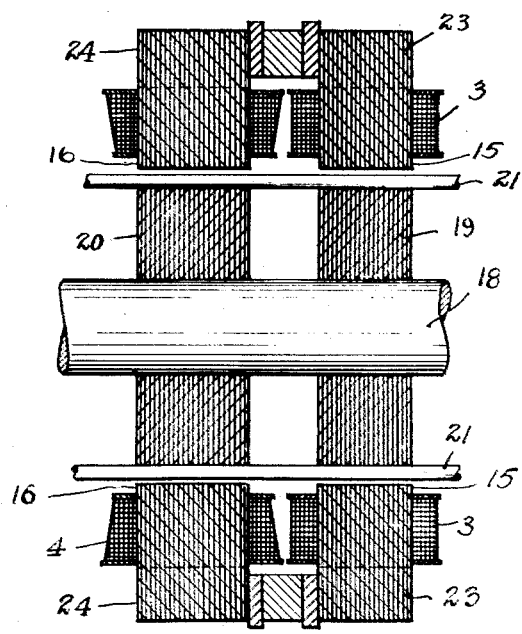
Figure 1:
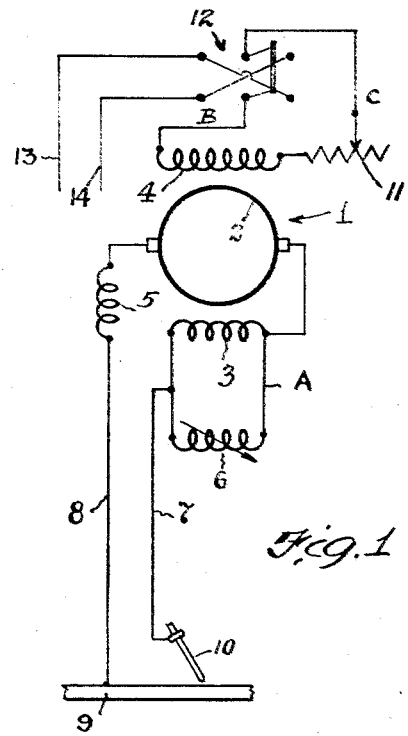
Figure 5:
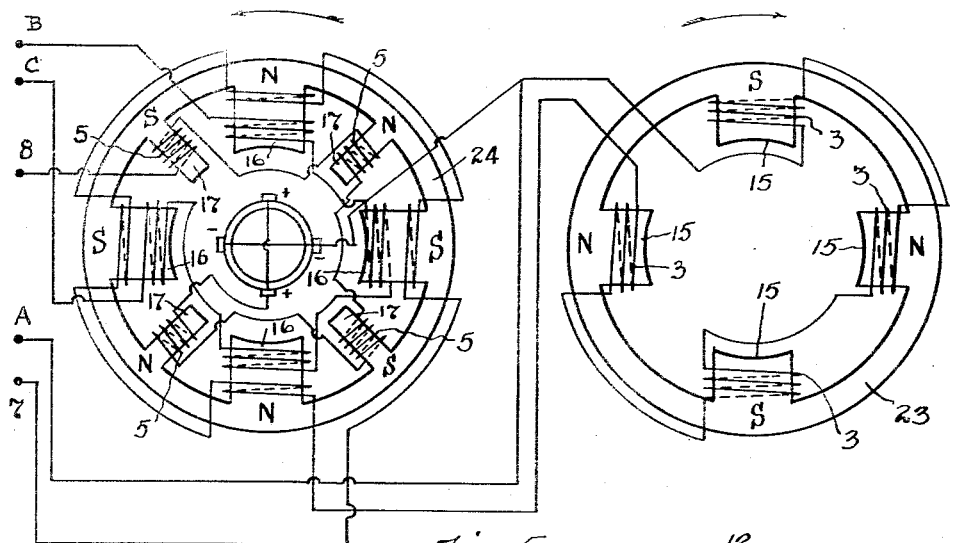
Figure 6:
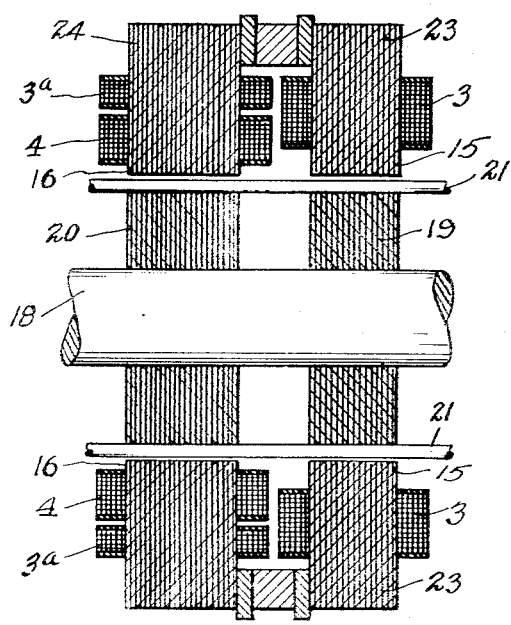
Figure 4:
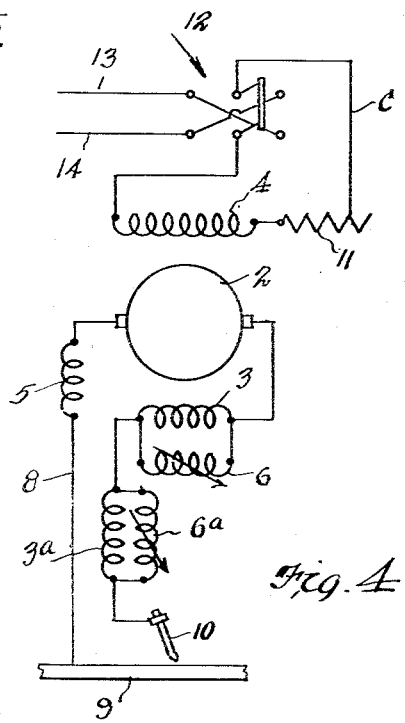

Fig. 1 is a schematic wiring diagram of an electric arc welding circuit and the welding current generator arranged in accordance with the principles of our invention; Fig. 2 is a schematic wiring diagram showing more particularly the arrangement of the field windings in the generator forming a part of the diagram illustrated in Fig. 1; Fig. 3 is a transverse sectional view of a generator such as has been diagrammatically illustrated in the previous figure and conventionally illustrating the mode of its mechanical construction; Fig. 4 is a schematic wiring diagram similar to Fig. 1, but showing an alternative form of arrangement for the series field windings in the welding current generator; Fig. 5 is a diagram similar to Fig. 2 but showing more particularly the arrangement of the fields according to the wiring diagram shown in Fig. 4; Fig. 6 is a view similar to Fig. 3 but showing the arrangement of the field windings as diagrammatically illustrated in Figs. 4 and 5; and Figs. 7 to 11 inclusive respectively show various modifications of the apparatus illustrated in Figs. 3 to 6.

Referring now more specifically to the drawings and more especially to Fig. 1, the welding circuit herein disclosed includes a welding current generator generally indicated at 1 which includes a rotor 2, a series field winding 3, a shunt or separately excited field winding 4 and an interpole winding 5. Connected around the series winding 3 is a variable reactive by-pass, generally indicated at 6 and hereinafter more fully explained and suitable leads such as 7 and 8 are, of course, provided to connect the generator with the welding electrodes, one of which may be the work 9 and the other may be any suitable form of welding pencil 10.

The exciting winding 4 preferably has a variable resistance 11 connected in series therewith and a switch such as 12 may be provided for the purpose of connecting the exciting winding 4 in opposite directions across the leads 13 and 14 to reverse the polarity of the machine, if desired.

The principal feature of the present invention relates to the arrangement of the windings 3 and 4 relatively to each other and to the conductor bars in the rotor so that the welding current required for consumption in the arc between the electrodes 9 and 10 will be generated in a novel manner and by an apparatus which has improved performance characteristics. More specifically, this invention relates to the method of generating electric arc welding current which comprises maintaining substantially separate magnetic fields respectively resulting from current flow in the exciting and series windings of the circuit and simultaneously moving through both of such fields different sections of a conductor which forms a part of the arc circuit. When the windings 3 and 4 produce magnetic fields which thread such conductor in opposite directions, the E. M. F. generated in the different sections of said conductor which respectively thread such separate fields will be in opposition.

The bucking effect of the series field in the prior art machines has been accomplished in either of one of two ways:—First, the series field winding has been placed on the same pole piece with the exciting winding and the resultant of the two opposing magnetic fields cut by the conductor bars carried by the rotor; and second, the series field has been placed on separate poles of pole pieces of the machine in order to, in effect, increase the impedance of the normal flux path of the field set up by the exciter windings so that again the resultant of the two fields was cut by the bars or conductors on the rotor.

The present invention relates to an arrangement of the exciting and series windings in the machine in such a manner that the magnetic fields produced by each, substantially independently of the other, is permitted to thread the rotor bars of the machine, thus eliminating many of the objectionable features encountered when attempts have been made to combine the two fields in either of the ways previously defined.

The above defined method of generating electric arc welding current in accordance with the principles of this invention may be best and most economically carried on in a generator in which the exciter and series windings are respectively arranged on two separate series of circumferentially spaced pole pieces with the poles of such series so related to each other and to the rotor bars that each rotor bar may simultaneously cut the fields produced by both poles, i. e., if the rotor bars extend truly axially of the machine, the two series of pole pieces respectively bearing the exciter and series windings will be arranged in axially adjacent pairs and when the effect of the series winding is to buck the effect of the exciter winding, the polarity of the two poles in each of such pairs will be different. The usual interpoles may, of course, be employed for the purposes for which such interpoles are usually employed.

Referring now more specifically to Fig. 2 there is illustrated herein two series of pole pieces respectively indicated by 15 and 16, the former carrying the series windings 3 and the latter carrying the shunt or separately excited windings 4. The interpoles 17 carry the interpole windings 5. The manner in which a machine may be constructed in accordance with the principles of our invention is shown somewhat diagrammatically at Fig. 3 in which 18 denotes the rotor shaft, which, of course, will be suitably supported at its opposite ends by the usual bearings. Carried by the shaft 18 is a rotor comprising sections 19 and 20 shown for purposes of convenience as being spaced for an appreciable distance axially of the rotor shaft 18. Carried by the rotor assembly are a plurality of conventional rotor bars 21 which, it will be noted, extend across the face of both rotor sections 19 and 20. The ends of the rotor bars 21 will, of course, be connected to a commutator such as 22 illustrated in Fig. 2, as is usual in the construction of apparatus of this character. The stator unit of the apparatus comprises spaced sections 23 and 24 so formed and positioned as to respectively lie opposite the rotor sections 19 and 20. The rotor and stator units illustrated in Fig. 3 will, of course, be supported in any suitable form of frame which, however, it is believed to be sufficiently well known to those familiar with the art that it will not be necessary to illustrate the same in the drawings. The stator section 23 is provided with a plurality of pole pieces 15 upon which the series windings 3 are positioned in the manner more clearly illustrated in Fig. 2 and the stator section 24 is provided with a plurality of pole pieces 16 upon which are mounted the shunt or separately excited windings 4, as likewise most clearly illustrated at the righthand end of Fig. 2. The interpoles 17 are, as indicated in the drawings, preferably mounted on section 24.

At this point it may be well to note that the section 23, as illustrated in Fig. 2, is as viewed from the righthand end of the machine, as shown in Fig. 3 and the section 24, as illustrated in Fig. 2, is as viewed from the lefthand end of the machine as shown in Fig. 3, the arrows above each of the sections in Fig. 2 denoting the direction of rotation of such section in order to produce the results indicated by the legends applied to such figure.

The variable reactance by-pass 6 around the series field winding 3, as shown in Fig. 1, which by-pass will preferably be a combination of resistance and reactance with the resistance unit either separate or combined with the reactance unit, such as by the employment of a resistance medium in the formation of the reactance coil, is a convenient and very effective means for controlling the energization of the series field winding 3 and accordingly the operating characteristics of the machine. The reactance of the by-pass 6 should preferably be equal to a substantial part of the reactance of the series field winding 3, so that when sharp variations in the amount of welding current flow occur, the distribution of such current flow between the winding 3 and the by-pass 6 will be, in a measure, at least, related to the resistance of these two branches of the circuit.

It will be noted that during the operation of the apparatus as illustrated in the drawings and as more clearly shown in Fig. 3, relative movement between the rotor and stator of the machine results in a simultaneous cutting by the conductor bars 21 of both fields respectively produced by the windings 3 and 4. The fields produced by these windings are substantially separate and independent inasmuch as the air gap between the stator and rotor sections is sufficiently great to cause the fields of the two windings to be respectively confined to the stator and rotor sections immediately adjacent thereto.

The distance between the rotor and stator sections for the purpose of thus isolating the fields respectively produced by the series and shunt or separately excited windings need not be any greater than is necessary to effect such separation of the fields, and it is of course obvious to those familiar with the art that the axial space between the rotor sections and stator sections may, for structural reasons, be filled with some non-magnetic material so that the axial space between the sections is the equivalent of an air gap. The axial distance between the rotor sections and stator sections may be extended to any desirable degree, it being apparent, of course, that for economies in manufacture, it is best to bring such sections as closely together as is practically possible and yet maintain the proper air gap or its equivalent between the two sections.

The arrangement illustrated in Figs. 4, 5 and 6 is generally similar to that illustrated in Figs. 1, 2 and 3, with the exception that an additional series field winding 3a is provided, and positioned on the shunt pole pieces 4. This series field winding 3a is cumulatively wound with respect to the shunt or separately excited winding 4 so as to accomplish the following results, viz:—

In a shunt generator, when current flows in the armature circuit, the armature ampere turns oppose the shunt ampere turns causing a reduction in ampere turns on the magnetic circuit. This reduction in ampere turns results in a reduction of flux and a corresponding reduction in generated voltage. When interpoles are added to the shunt generator, the current flowing through the interpole turns counteract the demagnetizing ampere turns of the armature but do not counteract the cross-magnetizing ampere turns. This means that while the ampere turns on the magnetic circuit may remain substantially constant, the flux is reduced due to crowding the flux towards one pole horn resulting in a decrease in flux in the magnetic circuit and a corresponding decrease in generated voltage. A series field placed around the shunt pole and energized by the current which flows through the armature circuit can be of such a value as to compensate for the effect of the armature cross-magnetizing ampere turns or may be increased to a value which will cause an actual increase in flux under load in place of a decrease which would normally occur in case the series field were not present.

Figure 7:
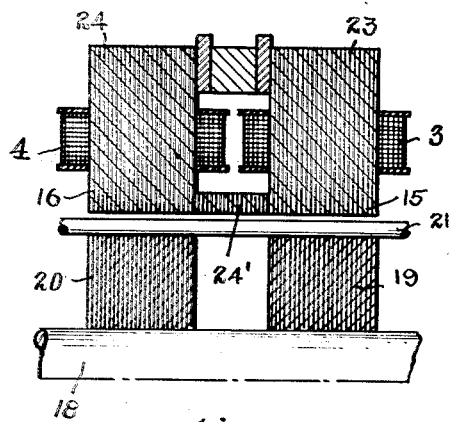
Figure 8:
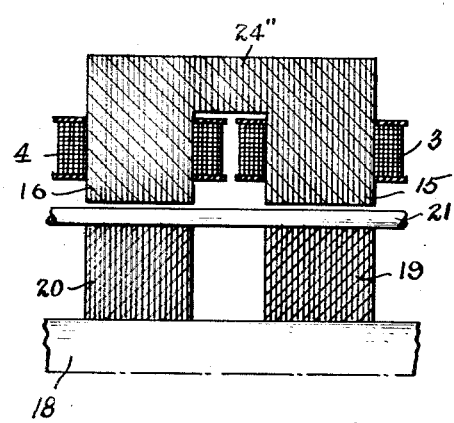
Figure 9:
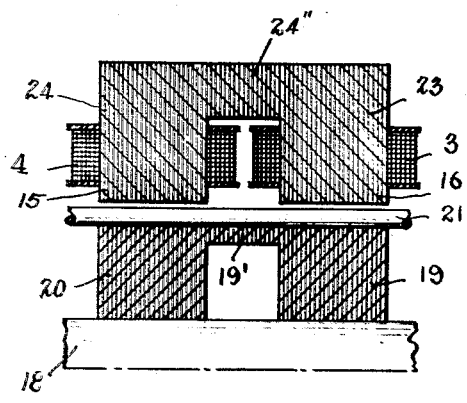
Figure 10:
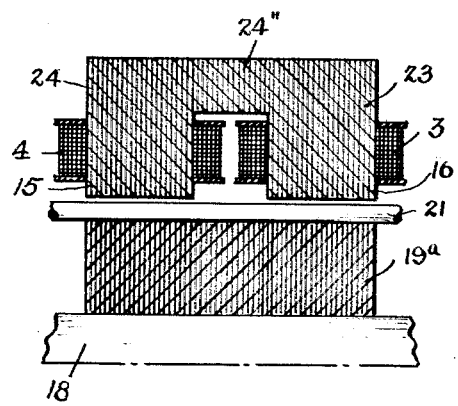
Figure 11:
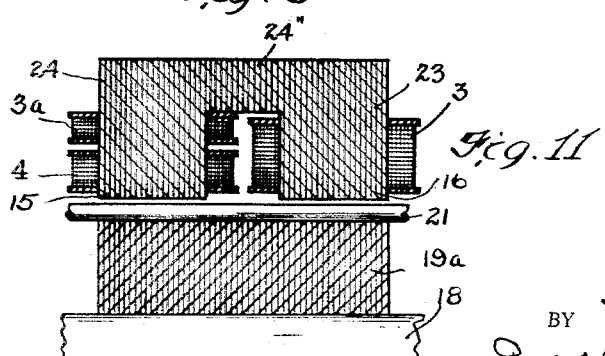

The effect on the flux through the shunt field of the series field winding 3a arranged in the manner above described may be secured in apparatus of the character illustrated in Figs. 1 to 3 by the provision of magnetic leakage paths between the fields respectively established by the windings 3 and 4, i. e., by the provision of a magnetic bridge 24' between the axially adjacent pole faces 15 and 16 as illustrated in Fig 7; a magnetic bridge 24" across the frames 23 and 24 as illustrated in Fig. 8; a magnetic bridge 19' across the armature sections 19 and 20 as illustrated in Fig. 9; or by making the armature 19a in one piece as illustrated in Figs. 10 and 11 instead of dividing the same into sections such as 19 and 20. The particular expedient adopted for the purpose of securing this effect between the two fields may be any of the ones above enumerated or a combination of the same, depending, of course, upon the particular operating characteristics desired. Since the various other elements of the apparatus as illustrated in Figs. 4 to 6 are substantially like those illustrated in Figs. 1 to 3, similar reference characters will be employed to designate like parts.

Any suitable means for varying the excitation of the series field winding 3a may be provided such as the variable shunt 6a. The shunt 6a may be either a plain resistance, a plain reactance, the combination of resistance and reactance, or taps from the winding 3a may be brought out of the machine to a suitable controller for effecting variations in the energization of such field. It is furthermore within the contemplation of our invention to mechanically link the variometers 6 and 6a, if desired, so as to simultaneously effect a control over both sections of the series field winding.

It should be noted that the winding 3a, while shown in the drawings as positioned on the outer parts of the poles 16, may preferably be positioned on the inner parts of such poles, i. e., adjacent the air gap between the pole pieces and the armature.

It is believed that the advantages occurring from the use of a construction, as above defined, will be so apparent to those familiar with the art upon an examination thereof that detailed enumeration of such advantages is not necessary. It might be noted, however, that whereas transformer action taking place between the series and shunt or separately excited windings has, in the prior art forms of apparatus, in each instance, reacted detrimentally to the performance characteristics of the prior art machines, a certain amount of such transformer action actually improves the performance characteristics of apparatus constructed in accordance with this invention. For this reason it may be found advisable, in certain forms of apparatus, to increase this transformer action by increasing the magnetic coupling between the series and shunt or separately excited windings.

Other modes of applying the principle of our invention may be employed instead of the one explained, change being made as regards the means herein disclosed, provided those stated by any of the following claims or their equivalent be employed.

We, therefore, particularly point out and distinctly claim as our invention:—

1. In a dynamo electric machine having relatively rotatable armature and field units, said field unit having axially aligned paired pole pieces, series and exciting windings respectively arranged on said pole pieces, and means establishing a magnetic linkage path between said pole pieces.

2. In a dynamo electric machine having relatively rotatable armature and field units, said field unit having axially aligned paired pole pieces, series and exciting windings respectively arranged on said pole pieces, and a magnetic bridge between said pole pieces.

3. In a dynamo electric machine having relatively rotatable armature and field units, said armature divided into axially spaced sections, said field unit having axially aligned paired pole pieces, series and exciting windings respectively arranged on said pole pieces, and means establishing a magnetic linkage path between said pole pieces.

4. In a dynamo electric machine having relatively rotatable armature and field units, said armature divided into axially spaced sections, said field unit having axially aligned paired pole pieces, series and exciting windings respectively arranged on said pole pieces, and a magnetic bridge extending between said pole pieces.

5. In a dynamo electric machine having relatively rotatable armature and field units, said field unit having axially aligned paired pole pieces, series and exciting windings respectively arranged on said pole pieces, series windings likewise arranged on the same pole pieces with said exciting windings and cumulatively wound with respect thereto, and means establishing a magnetic linkage path between said poles.

6. In a dynamo electric machine having relatively rotatable armature and field units, said field unit having axially aligned paired pole pieces, series and exciting windings respectively arranged on said pole pieces, series windings likewise arranged on the same pole pieces with said exciting windings and cumulatively wound with respect thereto, and a magnetic bridge between said poles.

7. In a dynamo electric machine having relatively rotatable armature and field units, said armature divided into axially spaced sections, said field unit having axially aligned paired pole pieces, series and exciting windings respectively arranged on said pole pieces, series windings likewise arranged on the same pole pieces with said exciting windings and cumulatively wound with respect thereto, and means establishing a magnetic linkage path between said pole pieces.

8. In a dynamo electric machine having relatively rotatable armature and field units, said armature divided into axially spaced sections, said field unit having axially aligned paired pole pieces, series and exciting windings respectively arranged on said pole pieces, series windings likewise arranged on the same pole pieces with said exciting windings and cumulatively wound with respect thereto, and a magnetic bridge extending between said pole pieces.

JAMES F. LINCOLN.
GEORGE G. LANDIS.